United States Patent [19]

Soska et al.

[11] 4,040,888
[45] Aug. 9, 1977

[54] APPARATUS FOR PREPRESSING TRANSPARENT LAMINATED ASSEMBLIES

[75] Inventors: Frank A. Soska, Arnold; Lyle L. Shumaker, Natrona Heights, both of Pa.

[73] Assignee: PPG Industries, Inc., Pittsburgh, Pa.

[21] Appl. No.: 618,587

[22] Filed: Oct. 1, 1975

Related U.S. Application Data

[63] Continuation of Ser. No. 487,334, July 10, 1974, abandoned.

[51] Int. Cl.$^2$ .................. B32B 31/00; B30B 3/04
[52] U.S. Cl. .................. 156/497; 100/155 G; 100/172; 141/65; 156/582
[58] Field of Search ............ 156/103, 104, 106, 107, 156/286, 582, 285, 497, 382, 555; 141/65; 100/172, 155 G

[56] References Cited

U.S. PATENT DOCUMENTS

| | | | |
|---|---|---|---|
| 2,382,956 | 8/1945 | Boicey et al. | 156/104 |
| 2,673,168 | 3/1954 | Pascoe et al. | 156/582 |
| 3,249,479 | 5/1966 | Boicey | 156/104 |
| 3,810,815 | 5/1974 | Welhart et al. | 156/104 |
| 3,825,441 | 7/1974 | Achermann et al. | 156/285 |
| 3,933,552 | 1/1976 | Shumaker | 156/104 |

Primary Examiner—William A. Powell
Assistant Examiner—Jerome W. Massie
Attorney, Agent, or Firm—Edward I. Mates

[57] ABSTRACT

Laminated safety glass panels comprising sheets of rigid transparent material, such as glass, polycarbonate, acrylic plastic, polyester and the like, alternating with interlayer materials, such as polyvinyl butyral, polyurethane and the like, are prepressed to remove entrapped air at the interfacial surfaces to prepare the assemblies for final lamination. When the relatively rigid plies to be laminated have unsmooth surfaces, such as wavy surfaces, or surfaces having imperfections due to the penetration of the sheet during thermal treatment by tongs or other solid members that engage the rigid transparent sheet during its heat treatment prior to assembly for lamination, the preliminary pressing performed by the prior art techniques is insufficient to prevent oil from an oil autoclave used in the final laminating step from penetrating into the interfacial surfaces between adjacent rigid and relatively flexible layers of the assembly to be laminated. The present invention provides a novel package comprising apparatus enclosing the assembly to be laminated during the prepressing operation. The apparatus comprises a novel peripheral evacuation chamber so related to the assembly to be laminated as to enable existing autoclaves to complete the laminating operation while preventing the oil in the autoclave from penetrating into the vision area of the laminate along the interfacial surfaces between rigid and flexible layers of the laminated transparent window that results, which oil penetration causes a reject of the fabricated window.

6 Claims, 4 Drawing Figures

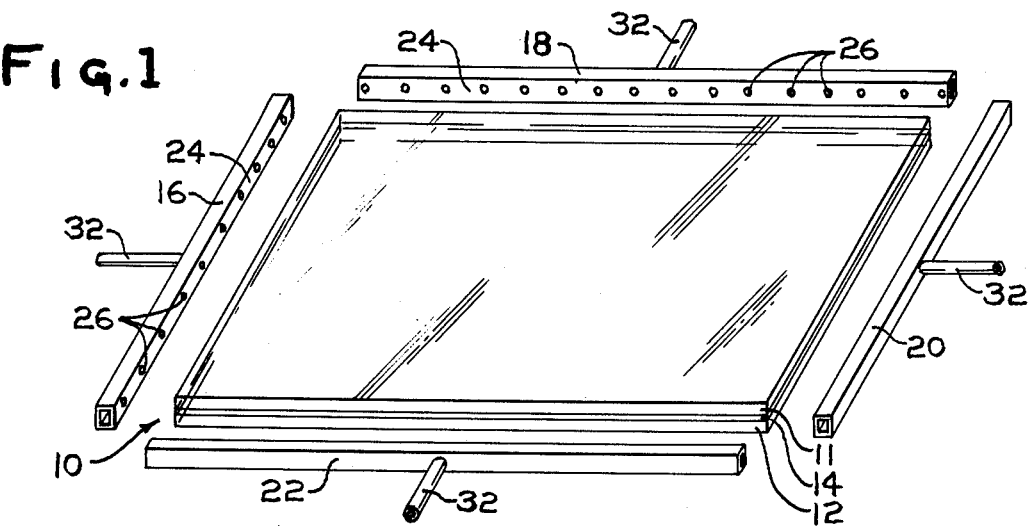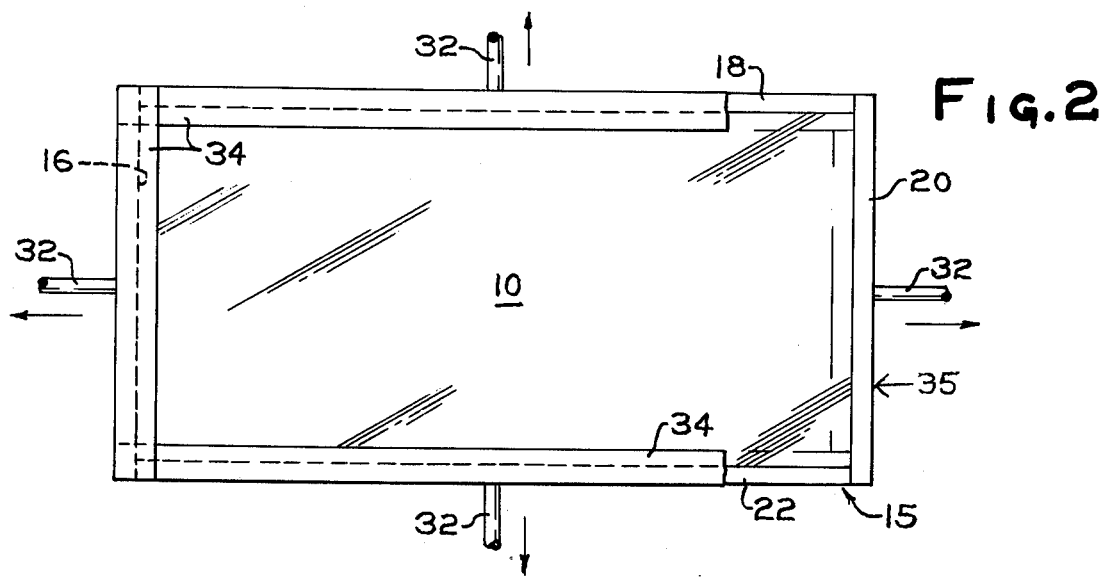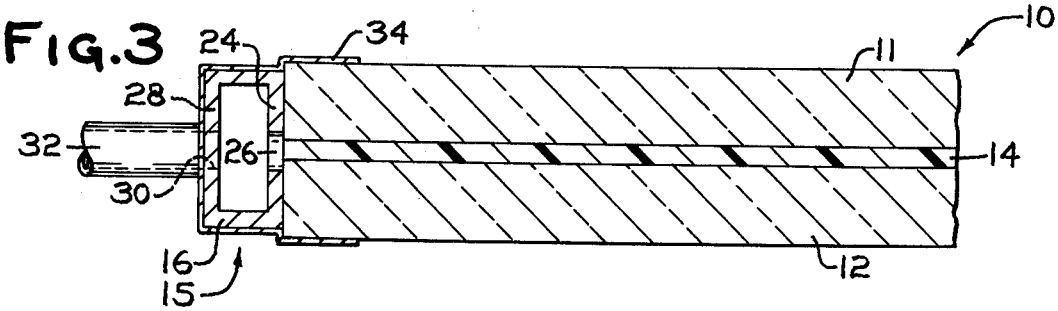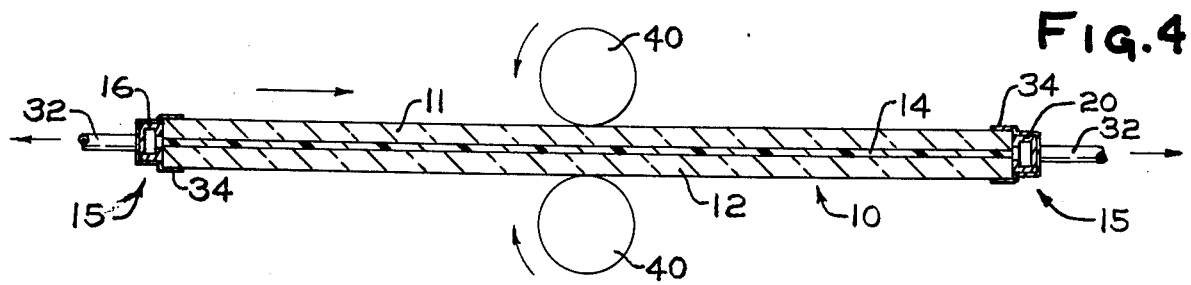

APPARATUS FOR PREPRESSING TRANSPARENT LAMINATED ASSEMBLIES

RELATION TO OTHER APPLICATIONS

This is a continuation of application Ser. No. 487,334, filed July 10, 1974 now abandoned.

BACKGROUND OF THE INVENTION

FIELD OF THE INVENTION

This invention relates to the lamination of rigid transparent sheets of glass or glass substitutes, each as polycarbonates, polyester resins, acrylic plastics and the like, with flexible interlayer materials such as polyvinyl butyral, polyurethanes and the like. The lamination of such materials produces laminated safety glass which has been developed for various uses, especially as windshield closures.

Flat assemblies to be laminated have been initially treated by a prepressing operation to bond the plastic interlayer to the opposing surfaces of the relatively rigid layers by heating the assembly and then passing the heated assembly between a pair of resilient nipper rolls. A typical glass rolling apparatus containing conventional resilient nipper rolls used in commercial prepressing operations is disclosed in U.S. Pat. No. 2,673,168 to Pascoe and Rugg. Another technique employed to prepress such assemblies to be laminated is disclosed in U.S. Pat. No. 2,948,645 to Keim. In this latter patent, the periphery and the margin only of the assembly is enclosed in a flexible channel saped member made of a fluid impevious material to place the member in engagement with a marginal portion of the outer surfaces of the assembly and in spaced relation to at least part of the periphery of the assembly to provide a conduit adjacent the periphery of the interfaces between the interlayer and the relatively rigid glass sheets, air is evacuated from the conduit through the member to remove air from between the interlayer and the glass sheets, the assembly and the material enclosing it are heated to an elevated temperature to bond the interlayer to each glass sheet in at least its marginal area while continuing the evacuation to maintain the vacuum in the conduit, the member enclosing the assembly is removed, and the assembly is ready for a final pressing operation.

Regardless of whether the prepressing step is performed by the roll pressing apparatus depicted in the Pascoe et al patent or by the peripheral evacuation technique as disclosed in the Keim patent, the prepressed assembly is then ready for final lamination where the assembly is directly exposed in an autoclave to an elevated temperature and an elevated fluid pressure substantially above atmospheric pressure and sufficient to bond the interlayer to the glass sheets substantially throughout the entire area of the assembly. As long as the relatively rigid sheets of glass or glass substitutes are very smooth, the prepressing operation, whether performed by nipper rolls or by peripheal evacuation channels, is sufficient to prepare the assembly for its final laminating step in an oil autoclave. However, when the surface of the relatively rigid sheet of glass or glass substitute material is not smooth and has either a wavy appearance or is provided with departures from smoothness caused by engaging the glass while hot with solid materials or glass handling elements needed to support the rigid material during a thermal treatment such as thermal tempering prior to assembling the elements for lamination, the prior art technique for prepressing has been found to be unsuitable. Oil has penetrated the prepressed assembly during the final laminating step in an oil autoclave.

In the past, oil penetration has been avoided by assembling the layers of rigid transparent material and interlayer material to form an assembly to be laminated. The assembled layers were taped together and the taped assembly inserted within a flexible bag which was then sealed and evacuated. The sealed bag and its contents were inserted in an oil autoclave and subjected to elevated heat and pressure for sufficient time to complete the lamination and produce a transparent laminated assembly. After lamination, the bag was opened and the laminated transparent assembly removed. Such a technique uses a flexible bag of the type described in U.S. Pat. No. 3,255,567 to Keslar and Rankin. While such bags avoided oil penetration during lamination, the cost of the bags and of the labor needed to perform a laminating operation using such bags made it economically unfeasible to use such a laminating method except in cases where the cost of the ultimate laminated window was not of any concern.

SUMMARY OF THE INVENTION

According to the present invention, a novel apparatus for use in the prepressing method invented by Lyle L. Shumaker disclosed and claimed in copending U.S. patent application Ser. No. 487,333, filed on July 10, 1974, which has issued as U.S. Pat. No. 3,933,552 on Jan. 20, 1976, has been developed. This prepressing method involves a combination of roll pressing using resilient nipper rolls of the type depicted in the aforesaid patent to Pascoe and Rugg and peripheral evacuation performed simultaneously when the sheets of transparent rigid material have surfaces that are sufficiently unsmooth to make it impossible to provide a preliminary edge seal by either roll pressing alone using resilient nipper rolls or peripheral evacuation using a peripheral evacuation chamber alone of the assembly. Unless the prepressing step is performed according to the present invention, oil penetration into the prepressed assembly cannot be avoided during the final laminating step when the prepressed assembly is subjected to elevated temperature and pressure while in direct contact with oil in an oil autoclave.

According to this invention, the assembly to be laminated is enclosed within apparatus comprising a peripheral evacuation chamber provided with apertures aligned to communicate with the interfacial surfaces between the interlayer sheet and the sheets of relatively rigid material. The peripheral evacuation chamber is sufficiently thin relative to the thickness of the assembly to be laminated that when a pair of nipper rolls is applied to prepress the assembly by roll pressing, the nipper rolls are spaced sufficient distance from one another so as not to contact the peripheral evacuation chamber.

The peripheral evacuation chamber is subjected to a vacuum during the time that the entire package including the assembly to be laminated enclosed within the peripheral evacuation chamber is passed between a pair of nipper rolls. Surprisingly, the combination of nipper roll pressing and peripheral evacuation provides suitable removal of entrapped air and gases and moisture from the interfacial surfaces between the interlayer and the rigid glass or glass substitute layers that the assembly can be subjected to a final lamination step in an oil autoclave at elevated temperatures and pressures without experiencing oil penetration. It is unnecessary to insert the prepressed assembly into a laminating bag of the type disclosed in U.S. Pat. No. 3,255,567 to Keslar and Rankin.

BRIEF DESCRIPTION OF THE DRAWINGS

In the drawings which form part of the description of an illustrative embodiment of the present invention, and wherein like reference numbers refer to like structural elements, FIG. 1 is an exploded isometric view of a package comprising a glass-plastic assembly and a frame like evacuation channel to be applied to the assembly according to the present invention;

FIG. 2 is a plan view of the assembly showing it in an assembled relationship to the frame-like evacuation channel to form the package for prepressing and with certain parts removed to show other parts of the package clearly;

FIG. 3 is a fragmentary enlarged cross-sectional view of an edge portion of the assembly; and FIG. 4 is a cross-section showing the arrangement of the assembly relative to a pair of pressing rolls illustrating that the pressing rolls are spaced apart from one another a distance equal to the thickness of the glass-plastic assembly to be prepressed and a greater distance than the height of the frame-like chamber surrounding the assembly to be prepressed.

DESCRIPTION OF THE PREFERRED EMBODIMENT

A glass-plastic assembly 10 to be prepressed comprises two flat sheets 11 and 12 of matching rectangular outline of relatively rigid transparent material such as glass or a glass substitute, whose surfaces are not exactly smooth, and an interlayer 14 of a flexible material, such as polyvinyl acetal or polyurethane or the like, commonly used to laminate glass sheets together. While the assembly to be prepressed is disclosed as containing two sheets of glass and one sheet of flexible material, it is understood that the assembly may include additional alternate layers of relatively rigid transparent material and relatively flexible material to provide an assembly of more or less than three layers to be laminated to form a transparent safety window closure. Furthermore, each interlayer of flexible material may consist of many plies of similar or dissimilar material and still be considered an interlayer. In addition, one or more of the rigid transparent sheets may be made of any of the commonly known glass substitutes such as polycarbonates, acrylic plastics, polyesters and the like.

The apparatus of the present invention comprises a peripheral evacuation chamber 15 comprising rectangular tubes 16, 18, 20 and 22. Each rectangular tube is provided with a straight apertured inner wall 24 that extends between an opposite pair of walls, the outer surfaces of which are spaced apart less than the thickness of the assembly 10. The inner wall 24 abuts one of the side edges along the perimeter of the glass-plastic assembly 10. The inner wall 24 is provided with spaced apertures 26. The apertures 26 are aligned with the interfacial surfaces along the outer edge of the interlayer 14. The apertures may have diameters that are larger than the thickness of the interlayer or may be arranged in staggered relation along rows that face the interfacial surfaces so that the apertures communicate with the interfaces between each glass sheet 11 or 12 and the interlayer 14.

Each rectangular tube has an outer wall 28 provided with an opening 30 provided with a fitting 32 adapted to receive an end of a vacuum hose line (not shown). The latter in turn communicates with vacuum pump (also not shown).

The rectangular tubes 16, 18, 20 and 22 have a height less than the thickness of the glass plastic assembly 10 to be prepressed prior to final lamination. A thin flexible tape of air impervious material, such as Mystic tape 7375 sold by Chatfield and Woods of Pittsburgh, Pa. or Permacel tape 927 sold by the Permacel Corporation of New Brunswick, N.J., is used to attach the four rectangular tubes 16, 18, 20 and 22 to the four sides of the rectangular assembly 10 with their spaced apertures 26 facing the outer perimeter of the glass-plastic assembly and their outer wall encompassed by the tape 34. As seen in the drawings, particularly FIGS. 3 and 4, the tape extends over the marginal edge portions only of the outer major surfaces of glass sheets 11 and 12 and over the outer surfaces of the outer walls 28 and of the opposite pairs of walls connecting the inner walls 24 with outer walls 28, thereby encompassing the marginal edge only of the assembly 35. The tape 34 may also be used to enclose the ends of any rectangular tube whose open ends would otherwise be exposed to the atmosphere. The resulting package 35 of assembly and apparatus is ready for lamination of the assembly 10.

EXAMPLE

A typical assembly to be prepressed and laminated comprises two tempered glass sheets ¼ inch thick and a plastic interlayer 0.060 inch thick surrounded by rectangular tubes made of metal 1/32 inch thick, ¼ inch wide and ½ inch high oriented so that the inner wall 24 and the outer wall 28 of each rectangular tube is ½ inch high and offset about 30 mils at its extremity from the outer surfaces of the glass-plastic assembly. The thin flexible tape 34 of air impervious material is 2 to 3 mils thick. The glass-plastic assembly together with the rectangular tubes and the tape forms a package that is subjected to simultaneous roll pressing and evacuation through the peripheral evacuation chamber 15 formed by the four rectangular tubes. Of course, if desired, the peripheral evacuation chamber 15 may be replaced by two or more evacuation chambers, such as one for each side of the assembly to be prepressed.

To accomplish the preliminary pressing, the package 35 of the illustrative embodiment was heated to a temperature of about 175° F. for 5 to 6 minutes, in the case of polyvinyl butyral and a slightly higher temperature for polyurethane interlayer. Vacuum was applied to the peripheral evacuation chamber and the entire package 35 with the rectangular tubes 16, 18, 20, 22 and the tape 34 surrounding the glass-plastic assembly 10 was passed between a pair of pressing rolls 40 of the conventional nipper roll type maintained at a space such that the minimum distance between the opposing peripheries of the pressing rolls 40 was approximately equal to the thickness of the glass-plastic assembly, and more than the height of the rectangular tubes plus two thicknesses of tape which form the package 35 containing the glass-plastic assembly 10.

After a glass-plastic assembly was prepressed as part of the package 35 in the manner recited, the tape 34 and the rectangular tubes 16, 18, 20 and 22 were removed and a batch of prepressed assemblies were loaded in an oil autoclave where they were subjected to temperatures as high as 275° F. and a pressure of 200 pounds per square inch for 20 to 45 minutes. Glass-plastic assemblies prepressed in the manner disclosed above were suitable for sale the customer.

In contrast the the above example, glass-plastic assemblies that were prepressed using either peripheral evacuation alone without pressing rolls or using pressing rolls alone without evacuation through a peripheral evacuation chamber such as that provided by the rectangular tubes in the illustrative embodiment described previously were unfit for sale to the customer because oil from the autoclave penetrated the interfacial surfaces of the laminate, particularly in the vicinity where the glass had been gripped by tongs during the tempering operation prior to its assembly with the plastic interlayer in preparation for lamination.

The package of the apparatus and assembly to be laminated may also be altered by incorporating parting material at an interfacial surface between one of the transparent rigid sheets and a layer of interlayer material. During prepressing, the parting material becomes bounded to either the rigid transparent material (such as is the case with metalo organosiloxane parting materials to glass or certain glass substitutes) or to the interlayer material (such as is the case with polyvinyl fluoride parting material to polyvinyl butyral or other polyvinyl acetals). The prepressed assembly is taped to maintain a unitary structure during final lamination in the autoclave. The parting material enables the rigid transparent sheet adjacent thereto to be separated from the rest of the assembly after the remaining layer have been laminated together to form a transparent safety laminated window.

The form of the invention shown and described in this disclosure represents an illustrative preferred embodiment and certain modifications thereof. It is understood that various changes may be made without departing from the gist of the invention as defined in the claimed subject matter which follows.

We claim:

1. Apparatus for prepressing an assembly of rectangular configuration to be laminated without requiring the insertion of said assembly within a bag, said assembly comprising a series of alternate layers of rigid transparent material and of interlayer material having a given total thickness between the outer major surfaces of said assembly, said layers being assembled in matching rectangular outline, said apparatus comprising
    1. an evacuation chamber abutting against and extending around the periphery of said assembly and having a pair of opposite walls whose outer surfaces form the outer surfaces of said chamber and are spaced from one another less than said total thickness, said outer surfaces being disposed inward of the major surfaces of said assembly, said evacuation chamber having an apertured inner wall whose apertures are adapted to abut the marginal edge of said assembly in position to enable said evacuation chamber to communicate with the interfacial surfaces intermediate said alternate layers on all four peripheral edges of said assembly,
    2. means adapted to communicate said evacuation chamber to a source of vacuum,
    3. thin, flexible means impervious to gas and moisture superimposed over said outer surfaces of said evacuation chamber and the marginal portion only of said outer major surfaces of said assembly to connect said outer surfaces of said evacuation chamber to the outer major surfaces of said assembly and to hold said evacuation chamber in said relation to said assembly, said flexible means having a maximum thickness such that the total thickness of two layers thereof plus that of the peripheral evacuation chamber as measured between said outer surfaces of said evacuation chamber is less than the thickness of said assembly,
    4. a pair of resilient nipper rolls mounted for rotation, and
    5. means to maintain said nipper rolls at a space therebetween such that the minimum distance between the opposing peripheries of the rolls is approximately equal to the thickness of the assembly, so that when said rolls rotate across said assembly, they engage the opposite major surfaces of the assembly and pass over the evacuation chamber in non-contacting relation to the portion of said flexible means superimposed over said outer surfaces of said evacuation chamber.

2. Apparatus as in claim 1, wherein said evacuation chamber comprises a series of tubes of rectangular cross-section, each having an apertured inner wall, one for abutting each side of said assembly with its inner apertured wall in facing relation to an edge of said assembly.

3. Apparatus as in claim 1, wherein said means adapted to communicate said evacuation chamber to a source of vacuum comprises an opening in the wall opposite said apertured wall and a fitting in said opening, said opening and fitting being disposed between the planes defined by the outer surfaces of said assembly.

4. Apparatus as in claim 1, wherein said thin, flexible means impervious to gas and moisture is a tape.

5. Apparatus as in claim 4, wherein said tape is 2 to 3 mils thick.

6. Apparatus as in claim 4, wherein said tape extends continuously from one major surface to said assembly to the other major surface of said assembly in superimposed relation about the walls of the evacuation chamber that do not abut against the periphery of said assembly.

* * * * *

UNITED STATES PATENT AND TRADEMARK OFFICE
CERTIFICATE OF CORRECTION

PATENT NO. : 4,040,888
DATED : August 9, 1977
INVENTOR(S) : Frank A. Soska and Lyle L. Shumaker It is certified that error appears in the above-identified patent and that said Letters Patent are hereby corrected as shown below:

Column 1, line 12, "each" should be --such--.

Column 1, line 31, "saped" should be --shaped--.

Column 1, line 32, "impevious" should be --impervious--.

Column 3, line 29, after "frame-like", please insert --evacuation--.

Column 5, line 5, after "sale", please insert --to--.

Column 5, line 32, "layer" should be --layers--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks